United States Patent
Siddiqi et al.

(10) Patent No.: US 10,715,560 B1
(45) Date of Patent: **\*Jul. 14, 2020**

(54) CUSTOM TRAFFIC TAGGING ON THE CONTROL PLANE BACKEND

(71) Applicant: Conviva Inc., Foster City, CA (US)

(72) Inventors: Faisal Zakaria Siddiqi, San Jose, CA (US); Alexey Serbin, Palo Alto, CA (US); Haijie Wu, San Mateo, CA (US)

(73) Assignee: Conviva Inc., Foster City, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/042,986

(22) Filed: Jul. 23, 2018

Related U.S. Application Data

(63) Continuation of application No. 14/961,670, filed on Dec. 7, 2015, now Pat. No. 10,079,861.

(60) Provisional application No. 62/089,163, filed on Dec. 8, 2014.

(51) Int. Cl.
*H04L 29/06* (2006.01)
*H04L 29/12* (2006.01)

(52) U.S. Cl.
CPC ...... *H04L 65/1066* (2013.01); *H04L 61/2007* (2013.01)

(58) Field of Classification Search
CPC . H04L 65/10; H04L 65/1066; H04L 65/1069; H04L 65/1083; H04L 61/2007

USPC .......................................................... 709/219
See application file for complete search history.

(56) References Cited

U.S. PATENT DOCUMENTS

| | | | |
|---|---|---|---|
| 8,209,729 B2 * | 6/2012 | Phillips | G06Q 30/02 725/87 |
| 8,482,593 B2 | 7/2013 | Periyannan | |
| 9,569,624 B1 * | 2/2017 | Nijim | G06F 21/60 |
| 2011/0096135 A1 | 4/2011 | Hegde | |
| 2012/0079529 A1 * | 3/2012 | Harris | H04N 21/2225 725/32 |
| 2013/0031575 A1 | 1/2013 | Gallant | |
| 2013/0041998 A1 | 2/2013 | Kordasiewicz | |
| 2014/0082206 A1 * | 3/2014 | Samuell | H04L 65/1069 709/227 |
| 2014/0219088 A1 | 8/2014 | Oyman | |

* cited by examiner

*Primary Examiner* — Ruolei Zong
(74) *Attorney, Agent, or Firm* — Van Pelt, Yi & James LLP

(57) ABSTRACT

Custom traffic tagging on a control plane backend is disclosed. Information associated with a video session is obtained. Based at least in part on at least some of the obtained information associated with the video session, additional metadata to associate with the video session is determined. The additional metadata is determined from metadata obtained from one or more disparate sources. The video session is associated with the determined additional metadata.

19 Claims, 6 Drawing Sheets

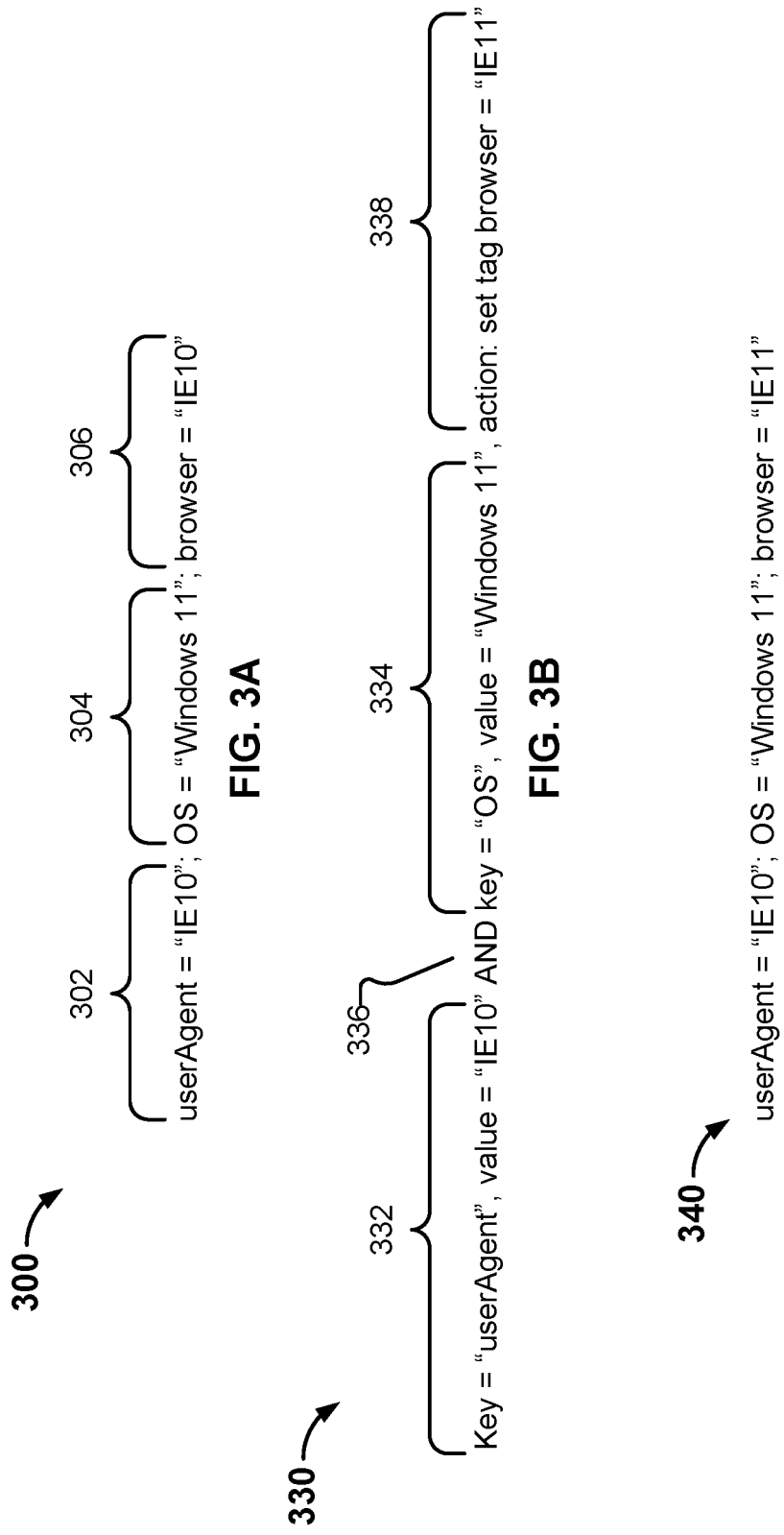

CUSTOM TRAFFIC TAGGING ON THE CONTROL PLANE BACKEND

CROSS REFERENCE TO OTHER APPLICATIONS

This application is a continuation of co-pending U.S. patent application Ser. No. 14/961,670 entitled CUSTOM TRAFFIC TAGGING ON THE CONTROL PLANE BACKEND filed Dec. 7, 2015 which claims priority to U.S. Provisional Patent Application No. 62/089,163 entitled CUSTOM TRAFFIC TAGGING ON THE CONTROL PLANE BACKEND filed Dec. 8, 2014, both of which are incorporated herein by reference for all purposes.

BACKGROUND OF THE INVENTION

Users are increasingly using networks such as the Internet to access content, such as video files and live streaming/video on demand content, via client machines. As demand for such content increases, there are challenges in distributing that content efficiently and with high quality. As one example, existing techniques are limited in the information that they are able to obtain about video playback.

BRIEF DESCRIPTION OF THE DRAWINGS

Various embodiments of the invention are disclosed in the following detailed description and the accompanying drawings.

FIG. 3A illustrates an example embodiment of a heartbeat message.

FIG. 3B illustrates an example embodiment of a metadata processing rule.

FIG. 3C illustrates an example embodiment of a transformed heartbeat message.

DETAILED DESCRIPTION

Figure 1A:
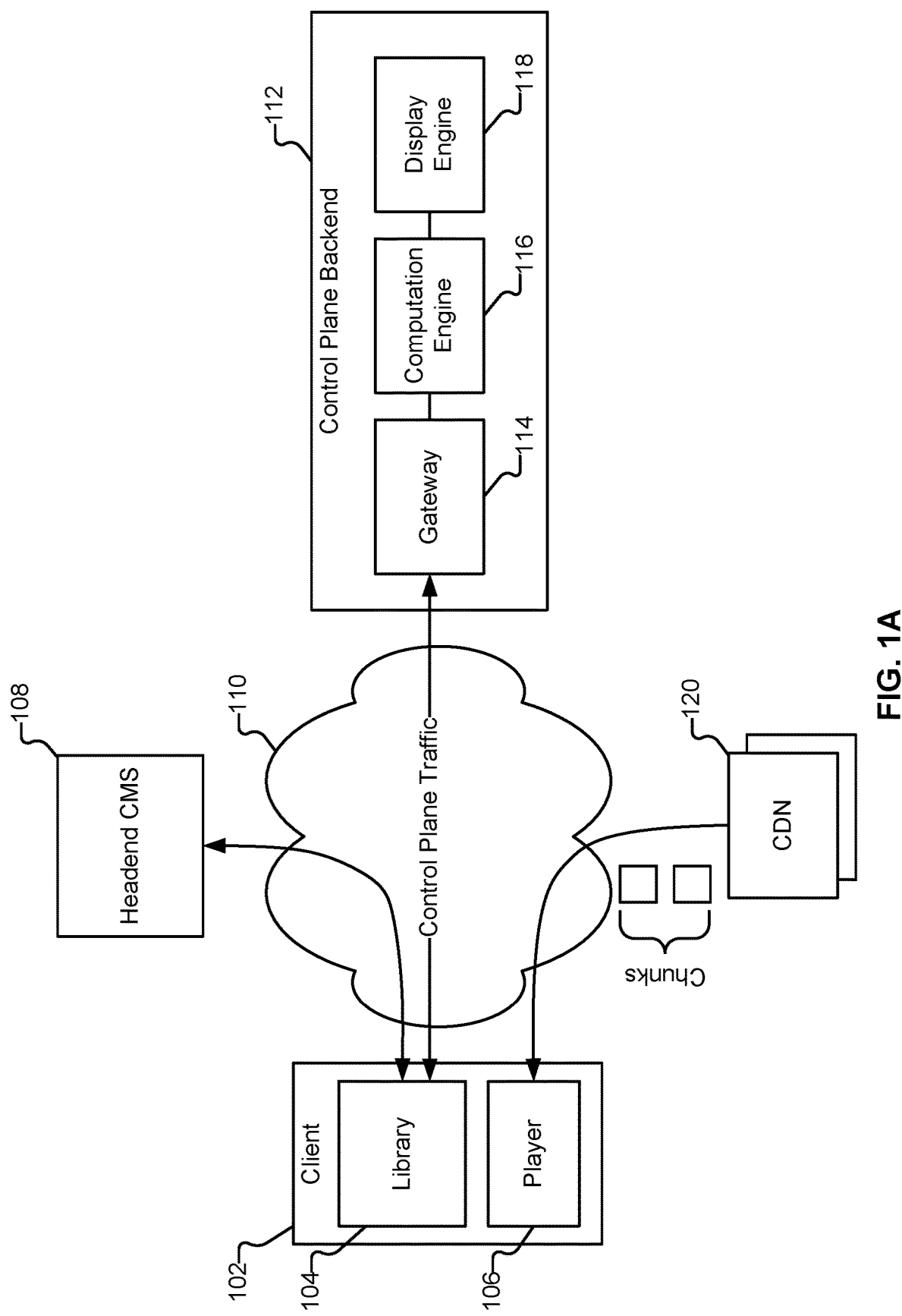
FIG. 1A illustrates an example embodiment of an environment in which metadata tagging is performed on a traffic generation source.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Content Distribution Overview

In distributing content, client devices are used to access content, such as audiovisual content (e.g., movies, songs, television shows, sporting events, games, images, etc.) that is owned by content owners. Content is stored (or captured) at origin servers, then distributed via other servers, caches, content delivery networks (CDNs), proxies, etc. (collectively, "content sources"). Examples of CDNs include Akamai, Limelight Networks, and Level 3 Communications. Content sources employ a variety of technologies and include HTTP, Adobe Flash Media, and Microsoft Internet Information Service servers.

When requesting content, the client is directed to a particular CDN and ultimately to a particular CDN node. The client device then begins streaming content from the CDN node, which is in turn rendered on the client device (e.g., via a Flash, Silverlight, or HTML5 player if a web browser application is being used). Examples of client devices include personal computers, laptops, cellular phones/personal digital assistants, and other types of information appliances such as set-top boxes, game consoles, smart TVs, broadband routers, file servers, video servers, and digital video recorders, as applicable.

Content distribution can be divided logically into two planes, the data plane and the control plane. When performing video streaming online, the data plane, as used herein, refers to a communication path for actual video data (e.g., data bytes) that makes up video frames and ultimately appears as images moving on a screen. When streaming video, a video file is separated into discrete chunks, which are delivered to clients via the data plane. Various chunking solutions are used, such as Apple® HLS (HTTP live streaming), HDS, etc. The chunking solutions/protocols are used to segment a video file into smaller pieces (i.e., chunks). Different protocols, such as HTTP and RTMP based protocols, may use different chunk sizes of different lengths (e.g., specified in seconds), resolutions, etc. In some embodiments, the data plane is provided by content sources such as content delivery networks (CDNs), which push actual video data to clients.

The control plane, as used herein, refers to a channel for metadata information and additional control protocols that describes and affects how the actual video data is being streamed. The metadata information included in control plane traffic can include information associated with a view, where a "view," as used herein, refers to a streaming session in which content was/is being played. Examples of metadata information associated with a view/session include metadata associated with a content item being played in the session, metadata associated with the client, metadata associated with a user of the client, etc. In some embodiments, a backend provides a portion/all of the control plane.

The tagging/labeling of views with metadata information enables, for example, business-specific meaning to be derived out of filtered views of traffic analytics.

As will be described in further detail below, in the example environment of FIG. 1A, the tags and labels associated with views are generated at traffic generation sources, such as a video playback device, for example, at the time when a video session is created.

As will be described in further detail below, in the example environment of FIG. 1B, tagging is configured to occur at other points on the control plane other than the playback device, such as a control plane backend.

While example embodiments in a video streaming (e.g., live and on-demand streaming) ecosystem are described below, the techniques described herein can variously be adapted to accommodate any type of multimedia/audiovisual content distribution, as applicable.

Traffic Tagging on Traffic Generation Sources

FIG. 1A illustrates an example embodiment of an environment in which metadata tagging is performed on a traffic generation source.

In the example shown, client device 102 is an example of a traffic generation source, and includes video player 106 and library 104. Library 104 is configured to obtain metadata and perform metadata tagging.

Suppose, for example, that a user of client 102 wishes to watch a video using video player application 106. In some embodiments, the player application is a dedicated application. In other embodiments, the player application is provided by a web browser application. In the example shown, the player application 106 resident on client device 102 connects to Content Management System (CMS) 108 (e.g., via one or more networks 110, such as the Internet) and requests the content. The CMS is also referred to herein as a "headend."

In this example, the client is directed (e.g., by CMS 108 and/or control plane backend 112) to make a request to a content source (e.g., CDN 120) and obtain video data (e.g., video manifest file and/or video data chunks).

In this example, the CMS also sends to the client metadata associated with the asset/content being streamed by the client. For example, the CMS sends metadata information such as the asset name, the genre (e.g., fantasy, action, drama, sci-fi, etc.), the actors/actresses featured in the content, etc.

In this example, library 104 is configured to generate control plane traffic to be provided to backend 112. For example, when a video session is created, library 104 is configured to generate a message that includes information about the session, where the session is tagged/labeled with metadata such as that obtained from/provided by the CMS (e.g., content asset name, genre, actors/actresses, etc.).

In one embodiment, the metadata information about the session is included in a heartbeat message, where, in some embodiments, a "heartbeat" message refers to a package/payload of information that is sent from a client to a backend. The heartbeat message is an example of control plane traffic that is generated at the client (i.e., the traffic generation source). The heartbeat messages can also include information such video quality of experience (QoE) information.

The heartbeat message for the session that includes the metadata injected at the client is then passed to backend 112, where it is received, for example, by gateway 114. Backend 112 is configured to obtain heartbeat messages from numerous clients. The metadata included in the session heartbeat messages can then be further processed. As one example, computation engine 116 is configured to perform analytics of the heartbeat message (or any other control plane traffic), where, for example, business-specific meaning can be derived out of filtered views of the traffic analytics (where filtering can be performed according to various metadata attributes). For example, computation engine 116 can be configured to determine, based on genre metadata tags, the number of people that have watched fantasy content. The results of such computation can then be provided as output, for example, in a dashboard or any other report, as appropriate, using, for example, display engine 118.

Traffic Tagging on the Control Plane Backend

In the example environment of FIG. 1A, metadata collection and tagging is performed at the client (control plane traffic generation source). There may be various challenges associated with performing tagging at a traffic generation source such as a video playback client device.

As one example, there may be challenges with scalability. Suppose, for example, that a large number of clients are streaming the same episode of a popular television show. The television show is associated with a myriad variety of metadata, such as asset name, genre, actors/actresses, etc., as described above.

In the example environment of FIG. 1A, CMS 108 sends to every client watching the same content the same metadata. Each client, in turn, generates a heartbeat including the same metadata that is transmitted to backend 112. Thus, large amounts of bandwidth may be utilized in sending duplicate data over a network such as the Internet.

There may also be challenges related to privacy and/or security. As one example, suppose that the user watching the content asset is a subscriber of content publisher Acme Video, with which the CMS is associated. The user has a subscriber identifier associated with their Acme Video account.

In some embodiments, the video streaming session, in addition to being tagged with information about the content asset being streamed/viewed, is also tagged with the subscriber ID. Information associated with the subscriber ID may also be included, such as the Internet Protocol (IP) address of the client device, the pricing tier of the subscriber ID, etc.

Such metadata information may be sent from the client to the backend via a public network, thus leading to potential security and privacy issues. Thus, for security/privacy reasons, it may be desirable to not send certain pieces of identifying information from the client.

There may also be challenges related to the introduction of metadata from different sources. For example, in the example environment of FIG. 1A, the metadata with which a session is tagged is provided by the CMS and funneled through the client. This may limit the ability of other entities to associate metadata with a video session.

Suppose, for example, that a client, for each session, sends its IP address to the backend. The user is a subscriber of an Internet Service Provider, Beta Internet. Now suppose that Beta Internet would like to know whether the particular IP address is associated with some particular network element in Beta Internet's network infrastructure. In this example, Beta Internet would like to further tag client sessions with an identifier of the network element based on clients' IP addresses. In the example of FIG. 1A, Beta Internet does not have access to client 102, and would have to request Acme Video to pass the desired metadata to the client on behalf of the ISP via the CMS 108. This may be cumbersome. Thus, it may be challenging for other entities/sources of metadata to attach/inject their metadata to client sessions.

Described herein are techniques for performing tagging at points on the control plane other than a playback device, such as a control plane backend.

As described herein, metadata tagging can be performed on the client (e.g., where metadata is funneled through clients through content management systems associated with content publishers), as well as performed on the control plane backend (i.e., tagging can be performed on clients/traffic generation sources and/or the control plane backend).

In some embodiments, the control plane backend is configured to use existing information about a video session (e.g., metadata added at a client that originates a heartbeat message associated with the video session) to determine what additional metadata information (which may be from a variety of disparate sources) should also be attached to the video session.

The metadata with which a video is tagged (either on the client or on the control plane backend) can come from various disparate sources. For example, content publishers, such as TV/studios, cable networks, etc. can provide content related metadata for a video session, such as the asset name, genre type (e.g., family, comedy, fantasy, etc.), a description of a video asset being watched, actors/actresses in the video, director, producer, etc. As another example, content aggregators can add additional metadata when they aggregate video content, such as the content source, referring links such as Universal Resource Locators (URLs) (e.g., when the content can be accessible from many different outlets), etc. The content aggregators/content providers can also provide metadata about the viewer (e.g., if they operate on a subscription model), such as a subscriber ID (or any appropriate identifier (ID) that can be linked to a subscriber ID). As another example, for live sports related content, a metadata service source (e.g., sports content provider) can provide metadata such as the type of sports content in a video session (e.g., football, baseball, hockey, etc.), teams involved, schedule, etc.

The client on which a session is established (and from which control plane traffic such heartbeats originate) can also be a source of metadata with which a video session is tagged. For example, a client can include metadata about the platform used to play content (e.g., iPad®, Xbox® One, PlayStation® 4, etc.), which can be added by a library installed on the client. As another example, the client can add its associated IP address to the video session.

The control plane backend can also be a source of metadata. For example, given the IP address of the client that initiated a video playback session, the backend can further add geolocation metadata about the client (e.g., country, state, city). In other embodiments, such geolocation information can be added by a third-party service (e.g., geolookup service), or by the client.

Internet service providers (ISPs) can also be sources of metadata used to tag video sessions at the control plane backend. For example, using the techniques described herein, an ISP can specify metadata to be associated with video sessions based on client IP addresses. For example, the service provider can provide to the control plane backend instructions that cause network element identifiers to be associated with the IP addresses of clients.

Any other appropriate type of entity (e.g., data services) can connect with the control plane backend system described herein to provide metadata to be used in tagging video sessions.

As will be described in further detail below, a mechanism is provided by which metadata can be added through a backend, without having to go through a client. In some embodiments, the backend is configured to add additional metadata information based on existing information about a video session (which can be added at the client).

By performing dynamic tagging/labeling of traffic on the control plane backend, various benefits can be provided, and challenges such as those described above can be addressed.

As will be described in further detail below, in some embodiments, an interface can be opened by a control plane backend to accept metadata from various disparate sources.

In some embodiments, the metadata is provided in the form of a metadata file (also referred to herein as a "custom lookup table"), which includes definitions of metadata processing rules that indicate how additional metadata is to be attached to a video session. The rules can be defined in a variety of different ways, for example, based on matching key-value pairs of the existing client information. The rules can also define what actions to take if a match to a rule is determined. Entities can use the custom lookup tables to define custom metadata that they would like to associate with video sessions.

In some embodiments, the "key" set in the key-value pairs included in the rules of a custom lookup table contains some attributes expected to be available in or derivable for incoming control plane traffic (e.g., heartbeat messages). The "values" can contain custom encodings (e.g., business-specific encodings). Custom lookup tables can be periodically transferred to the control plane backend.

Examples of metadata processing rules included in a custom lookup table/metadata file are described below in conjunction with FIGS. 2B and 3B.

In some embodiments, a backend system is configured to use the custom lookup table for a subset of all of the incoming control plane traffic. For example, as heartbeat messages are received and processed at the backend, "key" attributes are looked up in the custom lookup table and the "values" are tagged onto the heartbeat messages.

In some embodiments, a dashboard is provided that allows filtered views of the traffic using, for example, rules based on the encodings available in custom lookup tables.

An example environment in which such a backend is used to perform traffic tagging is described below in conjunction with FIG. 1B.

Figure 1B:
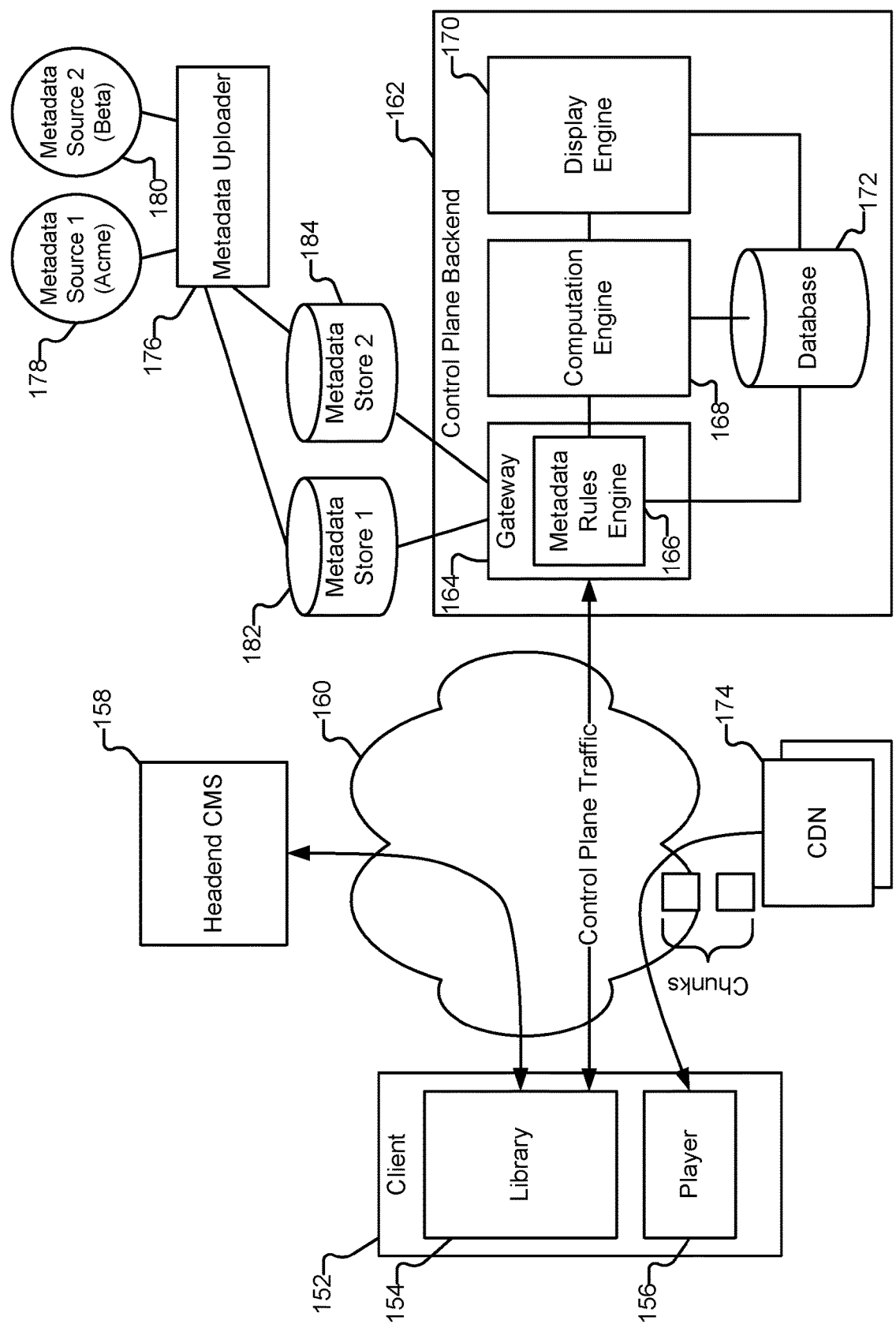
FIG. 1B illustrates an example embodiment of an environment in which metadata tagging is performed on a control plane backend.

FIG. 1B is an example embodiment of an environment in which control plane traffic tagging is performed at a control plane backend. In this example, in contrast to the example environment of FIG. 1A, a portion of metadata tagging is performed at a control plane backend (in addition to, or instead of, at a client device). As will be shown below, tagging at the control plane backend allows a streaming session initiated by a client to be tagged with metadata that is not limited to that provided by a source such as the CMS in the example environment of FIG. 1A (where metadata from the CMS is funneled through clients).

In this example, suppose that the content publisher Acme Video, which operates headend/content management system (CMS) 158, would like to add additional metadata to video sessions via control plane backend 162. Also suppose that the ISP Beta Internet would also like to add metadata to video sessions via the control plane backend.

In this example, Acme Video and Beta Internet (which are sources of metadata 178 and 180, respectively) use metadata uploader 176 to provide metadata to backend 162 to be used in performing tagging.

Metadata uploader 176 is configured to facilitate uploading of metadata files from various, disparate sources to backend 162. In some embodiments, the metadata is included in a metadata file/custom lookup table, details of which are described herein. The metadata file is uploaded via metadata uploader 176. The metadata file can be uploaded in a variety of ways.

As one example, the metadata file can be uploaded to backend 162 via a web interface provided by uploader 176. For example, the web interface can be configured to allow a user (e.g., associated with Acme Video or Beta Internet) to specify a URL (or any other appropriate link) that is a reference to a metadata file to be uploaded. The metadata file is then fetched using the specified URL.

As another example, metadata files can be pushed via an application programming interface (API) provided by uploader 176. In some embodiments, uploader 176 is a portion of a front end that communicates with backend 162. The uploader can also be implemented as a standalone application and/or a browser-based client application executing on a client device and communicating with backend 162.

In this example, the uploaded metadata files from sources 178 and 180 are processed and converted to an internal storage system. For example, the contents of the metadata files from sources 178 and 180 are stored to metadata stores 182 and 184, respectively. In some embodiments, each metadata store is associated with a corresponding metadata source. The metadata store can be implemented as databases. Each source can be associated with a logical metadata store that is separate from the metadata stores corresponding to other sources. In one example embodiment, metadata stores 182 and 184 are implemented using a database such as Mongo DB, and a file system such as GridFS.

As will be described in further detail below, the metadata in the metadata stores is used to perform tagging of control plane traffic. In some embodiments, uploader 176 and metadata stores 182 and 184 are collocated on the backend. The metadata stores can also be remote and accessed by the backend over a network such as the Internet, for example, via a query service. An example in which a backend queries remote metadata stores is described in further detail below in conjunction with FIG. 5.

Thus, using metadata uploader 176, metadata can be uploaded from various disparate sources and aggregated in a centralized manner to be used by a control plane backend to perform control plane traffic tagging.

As described above, in some embodiments, a custom lookup table includes a definition of metadata processing rules, which define how metadata is to be added to a video session (e.g., using existing information about the video session provided by the client, for example, in a heartbeat). As described above, key-value pairs can be used to determine a match with client information, with the metadata processing rules defining what actions to perform in the event of a match to the rules.

In this example, suppose that Acme Video uploads a custom lookup table that includes metadata processing rules that include key-value pairs that correspond to content name values. An example of a metadata processing rule based on content name is rule 240 of FIG. 2B.

In the example shown, the metadata processing rule 240 includes key-value pair 242. The key is the name/identifier of the attribute used to represent the content name, which in this example is "asset id." The value for this attribute is "Throne Games S01E02." As will be shown in further detail below, if the existing information in a received heartbeat message includes a key with the identifier "asset id" and a corresponding value, then the asset name specified in the heartbeat message is used to perform a lookup of Acme Video's custom lookup table to determine whether there is a match to any rules such as rule 240.

If the rule is matched, then action 244 is taken. As shown in this example, an action to insert a set of tags (e.g., genre, actor values, etc.) into a received heartbeat message is defined. Thus, the rule specifies a mapping between attribute values (e.g., content name) and additional metadata to be inserted, such that additional metadata is associated with a video session using existing information about the video session.

As another example, control plane traffic can be tagged with subscriber attributes. For example, Acme Video can upload a custom lookup table that includes subscriber specific information using obfuscated subscriber IDs as "keys." For example, Acme Video can upload a custom lookup table that includes a list of obfuscated subscriber IDs and corresponding metadata to attach for each obfuscated subscriber ID. This information can then be appropriately used to label a subscriber's session with other attributes that are not available on the session creating entity (e.g., client 152). Thus, for example, subscriber information that is potentially sensitive need not be sent over a network to clients from a CMS, from a CMS to the backend, or sent over the network to a backend by the clients, where clients may provide heartbeats to the backend via public networks that may be unsecured.

Figures 2A, 2B, 2C:
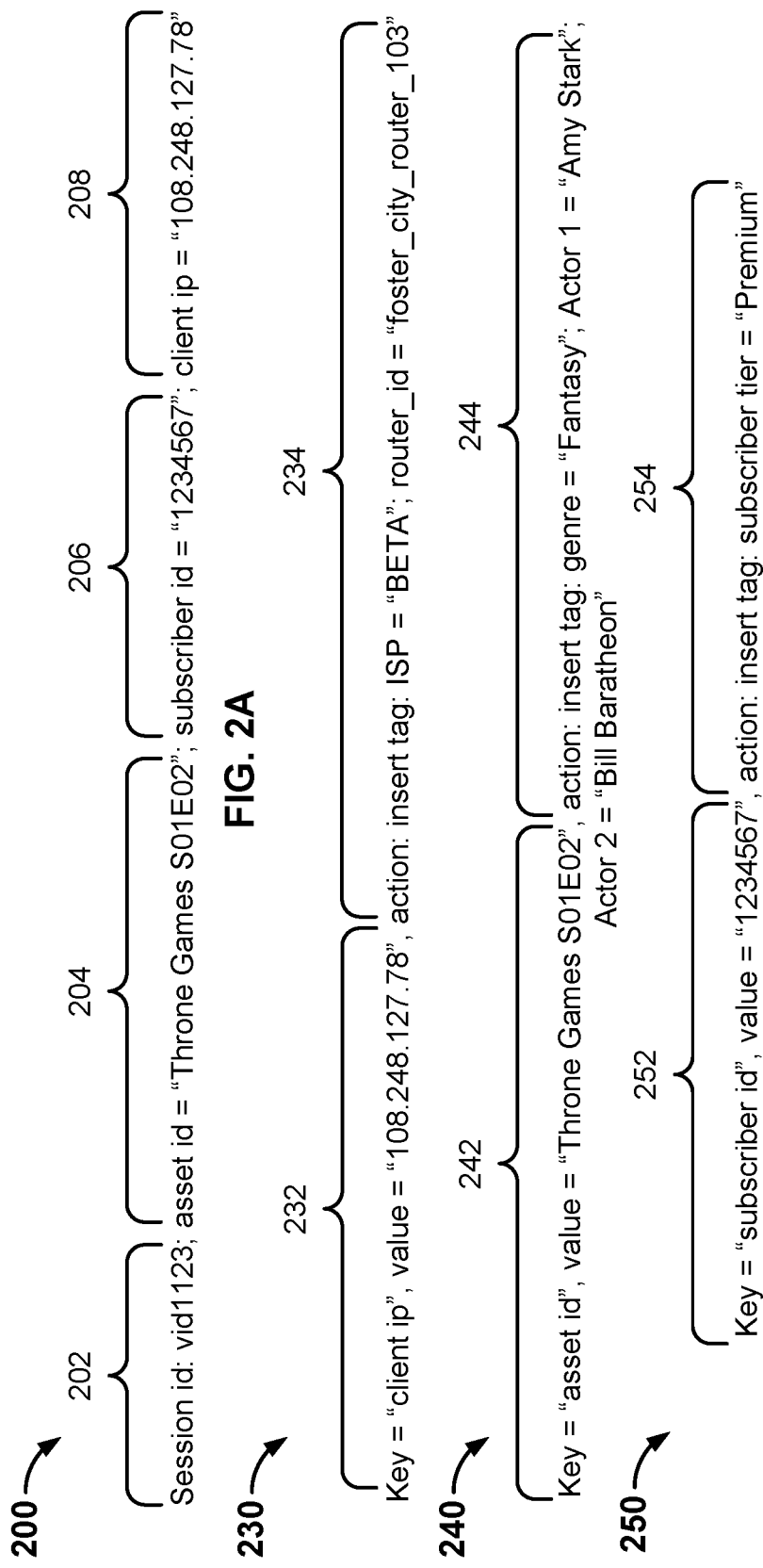
FIG. 2A illustrates an example embodiment of a heartbeat message.
FIG. 2B illustrates example embodiments of metadata processing rules.
FIG. 2C illustrates an example embodiment of a transformed heartbeat message.

An example of a rule based on obfuscated subscriber identifier values is rule 250 of FIG. 2B. In example rule 250, the key is the "subscriber id" attribute, and the corresponding value for this particular rule is the subscriber ID value "1234567," which corresponds to an obfuscated version of the actual, unique subscriber identifier value of a subscriber.

If a received heartbeat message for a video session at a client is associated with obfuscated subscriber ID 1234567 (e.g., as provided to the client by a CMS and included by the client in the heartbeat message that it generates), then a match to rule 250 is determined. Action 254 is then taken, where subscriber 1234567's subscriber tier is injected into the received heartbeat message. In some embodiments, custom lookup tables/metadata files are uploaded in a secure manner, preserving security and privacy of potentially sensitive information.

In this example, Beta Internet also uploads to the backend a custom lookup table. For example, Beta Internet, which has detailed knowledge about their internal network topology, can encode a map of their network topology into a custom lookup table. When used with a backend such as backend 162, the network topology can be overlaid upon, for example, video QoE traffic obtained from clients. Such tagging of heartbeat messages provides Beta Internet useful troubleshooting insights that are customized to their network topology.

In this example, Beta Internet uploads a custom lookup table that includes rules for adding additional metadata based on viewers'/clients' IP addresses. For example, Beta Internet can provide a custom lookup table that includes metadata processing rules that will add identifiers of network elements associated with IP addresses of clients.

An example of such a rule is rule 230 of FIG. 2B. In example rule 230, the key is the "client ip" attribute, and the corresponding value for this particular rule is the IP address value "108.248.127.78."

If a received heartbeat message for a video session at a client is associated with the IP address 108.248.127.78 (as tagged by the client when generating the heartbeat message), then rule 230 is triggered (e.g., based on a match of the received client IP address to the key-value pair 232 of rule 230). Action 234 is then taken, in which the name of the ISP and a network element associated with the IP address 108.248.127.78 are injected into the received heartbeat message.

In various embodiments, the metadata files are implemented as JSON formatted files, XML formatted files, comma separated values (CSV) formatted files, etc.

Suppose that a client 152 requests content from CMS 158, which is associated with Acme Video. In some embodiments, client 152 is an example of client 102 of FIG. 1A, and library 154 and player 156 are examples of library 104 and player 106 of FIG. 1A, respectively. Similarly to as described in the example environment of FIG. 1A, client 152 is directed (e.g., by CMS 158 and/or control plane backend 162) to make a request to a content source (e.g., CDN 174) and obtain video data (e.g., video manifest file and/or video data chunks).

In this example, CMS 158 provides client 152 with the name of the content asset being watched, as well as the subscriber ID of the user account being used to watch the content. In some embodiments, the subscriber identifier is obfuscated. In this example, in contrast to the example environment of FIG. 1A, CMS 158 does not funnel through the client any other additional metadata about the content (e.g., content genre, actors, directors, producers, etc.) or the subscriber (e.g., pricing tier). Instead, such metadata is instead provided by the CMS to backend 162 in metadata files via uploader 176, as described above.

As will be described in further detail below, backend 162 is configured to add such metadata to control plane traffic (e.g., heartbeat messages) associated with the subscriber's viewing session.

In some embodiments, upon initiating the video session in which the requested content is to be streamed, library 154 of client 152 is configured to generate a heartbeat message. The heartbeat message includes control plane traffic that includes information about the video session. An example of the heartbeat message generated by the client is heartbeat message 200 of FIG. 2A.

In this example, heartbeat message 200 includes session identifier 202, asset name 204, (obfuscated) subscriber identifier 206, and client IP address 208. In some embodiments, the asset name and subscriber identifier are provided to the client by the CMS. The client then includes the asset name and subscriber identifier in the heartbeat message that it generates when initiating a video playback session (which is assigned session identifier 202). The client also injects the IP address into the generated heartbeat message. As shown, each piece of metadata in the heartbeat message is represented using an attribute-value pair/key-value pair, where the name of an attribute and a corresponding value for the attribute are specified. As will be described in further detail below, the key-value pairs of the heartbeat message will be used to perform a lookup of custom lookup tables to determine whether there are any matching metadata processing rules (e.g., by matching key-value pairs).

The heartbeat message is then transmitted to control plane backend 162 over a network 160, such as the Internet. As will be described in further detail below, the existing information included in the heartbeat message will be used by the backend to determine what additional metadata information (e.g., provided by Acme Video and/or Beta Internet, as described above) should be further associated with the video session (e.g., by injecting additional metadata into the received heartbeat message).

In this example, the heartbeat message transmitted by client 152 is received by gateway 164 of backend 162. The heartbeat message is then processed by metadata rules engine 166 of gateway 164.

Rules engine 166 is configured to process received heartbeat messages and determine what additional metadata should be injected into the heartbeat messages. This can include consolidating metadata relevant to a specific video session from many different, disparate sources, such as metadata sources 178 and 180.

For example, the backend is configured to use existing information about a video session to determine what additional metadata with which the video session should be tagged. The existing information can include the metadata that was attached to the session by the client in the heartbeat message. Thus, using the techniques described herein, additional metadata can be associated with a video session beyond what is added by a client.

In this example, the heartbeat message 200 of FIG. 2A is processed by rules engine 166. The existing key-value pair metadata attributes (content name, obfuscated subscriber identifier, and IP address) of the video session included in the heartbeat message are extracted.

Metadata files/custom lookup tables are obtained (e.g., from metadata stores 182 and 184). It is then determined whether the existing key-value pairs extracted from the heartbeat message match to the key-value pairs of metadata processing rules in the obtained metadata files/custom lookup tables. Multiple metadata stores can be triggered for the same video session.

In some embodiments, the rules engine is configured to match the existing session attributes against a sequence of metadata rules included in the custom lookup tables.

For example, the key-value pair 204 in the heartbeat message associated with the content name (with attribute name "asset id" and value 'Throne Games S01E02") is used to perform a lookup of the custom lookup table provided by Acme Publisher. Rule 240 of FIG. 2B is identified as a result of the lookup, as the content name extracted from the heartbeat message matches to the key-value pair (242) defined for the rule.

Similarly, a lookup of the obfuscated subscriber identifier 206 in a custom lookup table provided by Acme Video returns matching rule 250 of FIG. 2B (e.g., by matching the identifier 206 with key-value pair 252 of rule 250). A lookup of the IP address 208 in the custom lookup table provided by Beta Internet returns matching rule 230 of FIG. 2B (e.g., matching key-value pair 232 of rule 230).

Actions specified in the rules identified by performing the lookup of the custom lookup tables using the existing session information are then taken.

In this example, each of rules 230, 240, and 250 of FIG. 2B specifies a set of metadata to inject/insert into the received heartbeat message 200. The injection actions are performed in response to the rules having been triggered. Thus, metadata from various disparate sources that is determined to be relevant/appropriate to a video session can be applied/consolidated into a single heartbeat message.

The result of the insertion of the additional metadata into received heartbeat 200 is modified/transformed/converted heartbeat message 280 of FIG. 2C. As shown, heartbeat 280 includes the existing information received in the original heartbeat 200, as well as the additional metadata that was inserted in response to rules 230, 240, and 250 having been triggered based on the lookup using the existing information.

As shown, metadata from potentially disparate sources that is determined to be relevant to a video session can be consolidated and aligned for a specific single video session.

Allowing dynamic tagging/labeling of control plane traffic at the backend provides various benefits, where, for example, per-device changes are not required, where tagging can be performed at a centralized location such as backend 162, instead of on each of the scores of potentially different video playing devices, which may have technical and/or logistical limitations.

Additionally, in the example environment of FIG. 1B, by migrating the tagging of the majority of content publisher metadata to the backend, transmission of duplicate metadata to clients from a CMS, and from clients to the backend can be reduced. Further, by using obfuscated subscriber IDs, actual unique subscriber identifiers need not be transmitted throughout a network such as the Internet between a CMS, client, and/or backend, thereby preserving privacy and protecting potentially sensitive account/subscriber information. Also, as shown in the example of the environment of FIG. 1B, in which Beta Internet is also able to configure and upload metadata to be tagged at the backend, other entities can provide metadata for tagging, such that the sources from which metadata is obtained need not be limited, for example, to a CMS. Thus, additional metadata can be associated with a video session beyond what is added by a client.

As another example benefit, in addition to facilitating computation (e.g., of metrics), performing tagging of traffic at the control plane backend allows for streaming decisions to be made based on the latest metadata information. For example, if the tagging is done at the client, it may be difficult/challenging to improve/change control plane logic that is based on metadata information. By doing such tagging at the backend, flexibility can be added to the decision making capability of the control plane (e.g., selection by control plane of bitrates and/or CDNs for clients to use when obtaining content).

In some embodiments, compound rules can be configured, where actions are taken in response to multiple rules triggering according to logical expressions (e.g., using Boolean logic to specify the relationships among rules). The conditions for matching to a single rule can also be defined using logical expressions. For example, multiple key-value pairs can be logically combined using Boolean operators such as "AND" and "OR," where multiple key-value pairs in the received heartbeat message must meet the condition specified by the logical expression for the rule to be triggered and a corresponding action taken. In some embodiments, rules can be specified for taking action with respect to metadata provided by two different sources (e.g., rules can be defined across multiple metadata sources/stores). For example, a rule can be specified that matches based on key-value pairs for both asset name and IP address, with the corresponding action defined to be the insertion of metadata from both Acme Video and Beta Internet metadata stores.

The modified heartbeat messages generated by metadata rules engine 166 can then be further processed. For example, the modified heartbeat messages can be stored to database 172, which can be implemented as persistent storage.

In some embodiments, the modified heartbeat messages are passed to computation engine 168, which is configured to use the modified heartbeat messages to perform computations/calculations. In some embodiments, computation engine 168 is an example of computation engine 116 of FIG. 1A In some embodiments, display engine 170 is configured to present (e.g., in a dashboard) as output the results of calculations using the modified heartbeat messages. For example, the calculation results can be presented as output in a dashboard in a web interface provided by the display engine. In some embodiments, display engine 170 is an example of display engine 118 of FIG. 1A.

In some embodiments, management of stored metadata is performed. For example, version control of obtained metadata files/custom lookup tables stored to metadata stores is performed (e.g., by metadata uploader 176 or a separate component managing the metadata stores). For example, metadata sources may upload multiple new versions of custom lookup tables over time. Historical versions of custom lookup tables can be preserved. In some embodiments, when evaluating heartbeat messages against metadata rules (e.g., in real-time, as heartbeats for a current session are received), the most recent version of the metadata files is applied. Version control can also be performed in response to changes in a metadata file being made. In some embodiments, each version of a metadata file that is uploaded is timestamped and logged.

As one example scenario in which version control is performed, suppose that Beta Internet would like to monitor network topology changes. In a first version of a custom lookup table uploaded by Beta Internet, a subset of IP addresses is associated with metadata indicating network element "A."

At a subsequent time, Beta Internet makes a change to their network topology, where network element "A" is switched to network element "B." Beta Internet uploads a new version of the custom lookup table so that video sessions associated with the same subset of IP addresses will now be associated with the new network element "B."

Both the previous version and the new version of Beta Internet's custom lookup table are maintained. By maintaining the various versions of the metadata files, diagnostic checks, debugging, before-and-after comparisons, etc. can be performed. For example, an operator-user associated with Beta Internet can evaluate, for example, how streaming performance has changed for clients before and after the switch from network element "A" to network element "B." For example, the operator user can use a dashboard provided by display engine 170 to filter sessions based on network element. If a degradation in performance is determined to occur, then Beta Internet can revert back to using network element "A," and also revert to the previous version of the custom lookup tables.

Control plane backend 162 is illustrated as a single logical device in FIG. 1B. In some embodiments, control plane backend 162 comprises standard commercially available server hardware (e.g., a multi-core processor, 4+ Gigabytes of RAM, and one or more Gigabit network interface adapters) and runs typical server-class operating systems (e.g., Linux), as well as Java HTTP server software stack. Control plane backend 162 can also be implemented using a scalable, elastic architecture and may comprise several distributed components, including components provided by one or more third parties. Further, when control plane backend 162 is referred to herein as performing a task, such as storing data or processing data, it is to be understood that a sub-component or multiple sub-components of control plane backend 162 (whether individually or in cooperation with third-party components) may cooperate to perform that task.

In the above example rules of FIG. 2B, the actions that were taken included inserting additional metadata. Other actions can be defined as well. For example, rules can be specified such that when triggered, the rules cause a metadata override action to be taken. An example of such metadata overriding/overwriting is described in conjunction with FIGS. 3A-C.

Suppose for example that heartbeat 300 of FIG. 3A is received from a client, such as client 152 by gateway 164 of backend 162. In this example, heartbeat 300 includes key-value pair 302 associated with the client's user agent, key-value pair 304 associated with the client's operating system, and key-value pair 306 associated with a browser associated with the client.

The metadata tags/key-value pairs in heartbeat 300 are used by rules engine 166 to perform a lookup of metadata file(s). In this example, rule 330 of FIG. 3B is identified as a match, as the condition specified in rule 330 (the logical combination of key-value pair 332 AND (336) with key-value pair 334) is met by both key-value pairs 302 and 304 having been included in heartbeat 300.

In response to identifying rule 330, action 338 defined in rule 330 is performed. In this example, the action is to set the browser tag 306 of the heartbeat message to "IE11." Thus, based on the action, the value for the browser metadata at 306 is changed/overwritten from "IE10" to IE11," resulting in modified heartbeat 340 of FIG. 3C. Thus, existing metadata in a received heartbeat can be overwritten if a conflicting value is obtained from a metadata source.

Figure 4:
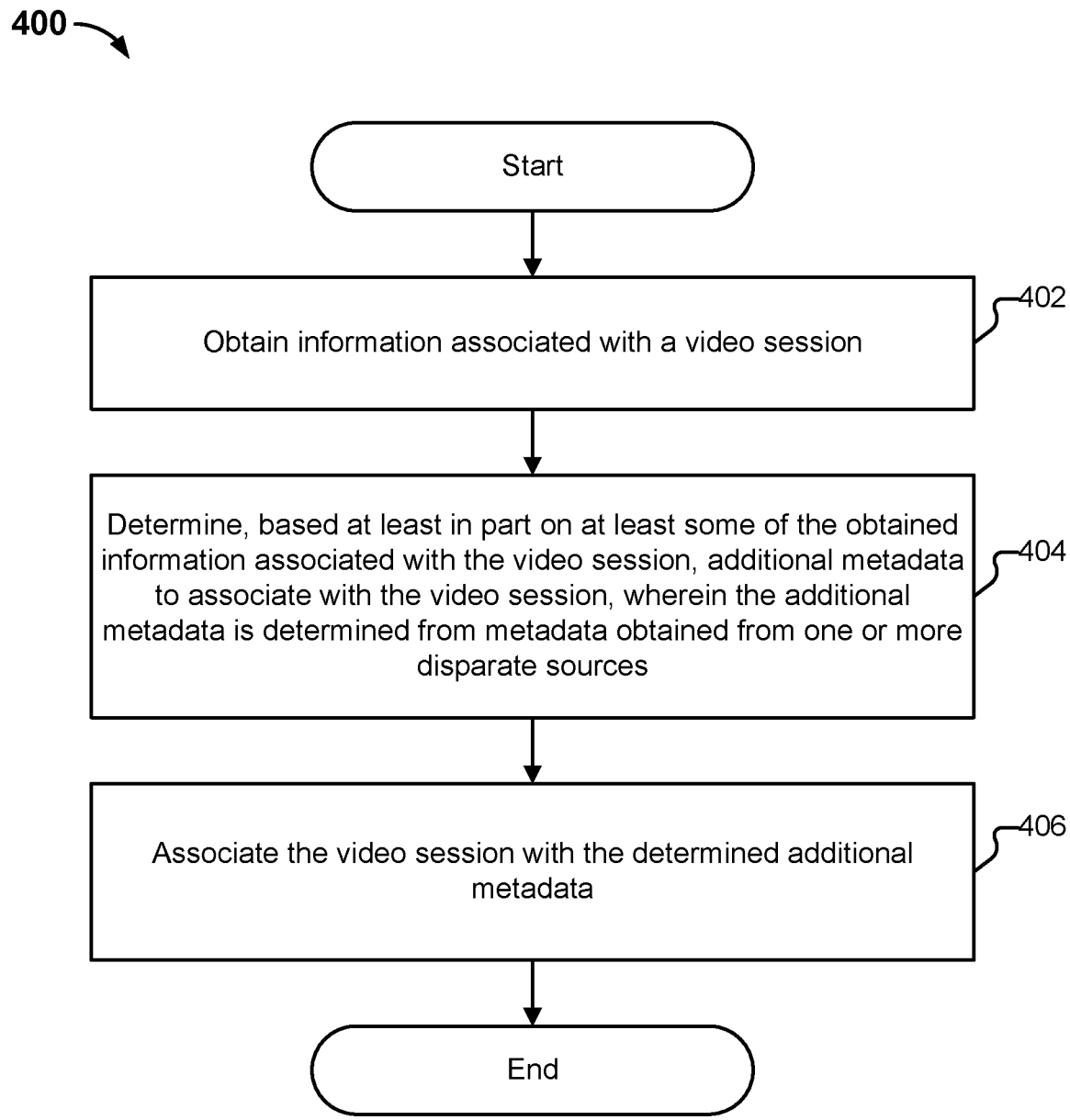
FIG. 4 is a flow diagram illustrating an embodiment of a process for performing traffic tagging on a control plane backend.

FIG. 4 is a flow diagram illustrating an embodiment of a process for metadata tagging. In some embodiments, process 400 is executed by control plane backend 162 of FIG. 1B. The process begins at 402 when information associated with a video session is obtained. As one example, a heartbeat message, as described above, is received from a client that initiated a video playback session. The heartbeat message includes metadata about the video session, such as information associated with an asset (e.g., the name of the content asset being watched). The heartbeat message can also include information about a user of a client used to play content, such as a subscriber identifier. The subscriber identifier can be an obfuscated subscriber identifier. In some embodiments, the information associated with content and/or the subscriber identifier is provided to the client from a content management system, where it is then tagged to the video session (e.g., injected into the heartbeat message associated with the video) by the client.

The heartbeat message can also include metadata about the client, such as the client's IP address, the user agent of the client, the operating system of the client, the device type, brand, model, platform used to play the video, etc. In some embodiments, the metadata in the heartbeat is stored as key-value pairs, where a key indicates the name/identifier of an attribute, and the value is the corresponding value for the attribute. Examples of heartbeat messages include heartbeat message 200 of FIG. 2A and heartbeat message 300 of FIG. 3A, described in further detail above.

At 404, at least some of the obtained information associated with the video session is used to determine additional metadata to associate with the video session. In some embodiments, the additional metadata is determined from metadata obtained from one or more disparate sources.

The disparate sources can include external sources (e.g., that are remote to a backend such as control plane backend 162). A control plane backend can also be a source of metadata. In various embodiments, examples of disparate metadata sources include content publishers, service providers (e.g., ISPs), content aggregators, metadata services, etc. In some embodiments, metadata is obtained via uploading. For example, metadata sources can upload metadata via a web interface (e.g., using a URL or any other appropriate reference to metadata to be uploaded) or via an API, as described above. The metadata can be uploaded in the form of metadata files/custom lookup tables, as described above. The metadata can be uploaded or otherwise provided on a recurring basis or on-demand.

As described above, in some embodiments, a metadata file/custom lookup table includes a definition of metadata processing rules, which define how metadata is to be added to a video session. As described above, the metadata file can include key-value pairs upon which rules matching is based (e.g., matching to existing heartbeat information), as well as a corresponding action to take if the rule is triggered based on key-value pair matching. The action can include an instruction to associate a video session with a particular set of metadata (e.g., by inserting the metadata into a received heartbeat). Another example of an action is to set a metadata to a particular value, which can include overwriting existing metadata values.

In some embodiments, the metadata files uploaded from sources are stored to metadata stores, as described above. In some embodiments, each metadata store is associated with a corresponding metadata source. Version control of metadata files can also be performed, where multiple versions of metadata files (e.g., historical versions) are maintained. For example, metadata files, as they are uploaded, can be time-stamped and logged.

In some embodiments, the determination of what additional information to associate with the video session is made by using the existing information that is obtained from the client to perform a lookup of metadata files/custom lookup tables to find matching metadata processing rules.

For example, key-value pairs in a received heartbeat are matched to the key-value pairs defined in metadata processing rules, as described above. The key-value pair matching can also be based on logical expressions. For example, rules can be triggered based on a logical condition involving multiple key-value pairs being satisfied. An example of using Boolean logic to create a logical matching expression using multiple key-value pairs is described in conjunction with rule 330 of FIG. 3B.

In some embodiments, if a match is found, the matching metadata processing rule is obtained, and an action defined in the metadata rule is performed. As described above, the action can include an instruction to associate a particular set of additional metadata with the video session. For example, as described in the example environment of FIG. 1A, based on a match to a content name specified in a received heartbeat, a rule matching to the content name can be identified that indicates that metadata such as genre, director, producer, actors, etc. should be inserted into the heartbeat message. As another example, an obfuscated subscriber identifier injected at the client can be extracted from the heartbeat and used to determine what additional metadata associated with the obfuscated subscriber ID (as indicated in a metadata file including a list of obfuscated subscriber ids and corresponding information) should be added. As another example, a client IP address extracted from the received heartbeat can be used to determine additional metadata (e.g., geolocation data, ISP network information, etc.) to attach to the video session. Examples of metadata rules are described in conjunction with FIGS. 2B and 3B.

In some embodiments, determining additional metadata to attach/associate with a video session includes matching a sequence of metadata rules, and for each rule, inserting metadata as specified by the matched rule.

At 406, the determined additional metadata is associated with the video session. In some embodiments, the metadata determined at 404 to be relevant/applicable to the video session (which is potentially across a plurality of disparate sources) is aligned and consolidated into the heartbeat message obtained at 402. This can include injecting the additional metadata specified by triggered rules into the original heartbeat message, resulting in a transformed heartbeat. In some embodiments, other metadata related actions, such as metadata overwriting, as described above, can be performed, and a received heartbeat message modified accordingly.

In some embodiments, the modified heartbeat message associated with the video session is stored. For example, the modified video session information is stored to a persistent storage, where it can be used to perform analytics. In some embodiments, the modified heartbeat message is used to perform calculations/computations, where the calculations can use the injected metadata, for example, to segment/filter video sessions/views (e.g., to view the number of sessions in which fantasy content was watched). The results of the calculations/computations can be provided as output, for example, via a dashboard.

Scaling

As described in the example environment of FIG. 1B, clients such as client 152 communicate control plane traffic to gateways such as gateway 164 of control plane backend 162. As clients can be at various remote locations (e.g., around the world), in some embodiments, gateways are distributed globally to provide entry points to the variously located clients. The gateways are configured to perform control plane traffic tagging, as described above.

Described below is a scalable infrastructure for communication/publishing of metadata to distributed gateways to be used in tagging control plane traffic. As will be shown below, using the mechanisms described herein, uploaded metadata can be distributed to gateways in real-time, allowing for metadata consistency to be maintained across distributed, remote gateways, and video sessions to be tagged with metadata as new metadata processing rules are uploaded.

Figure 5:
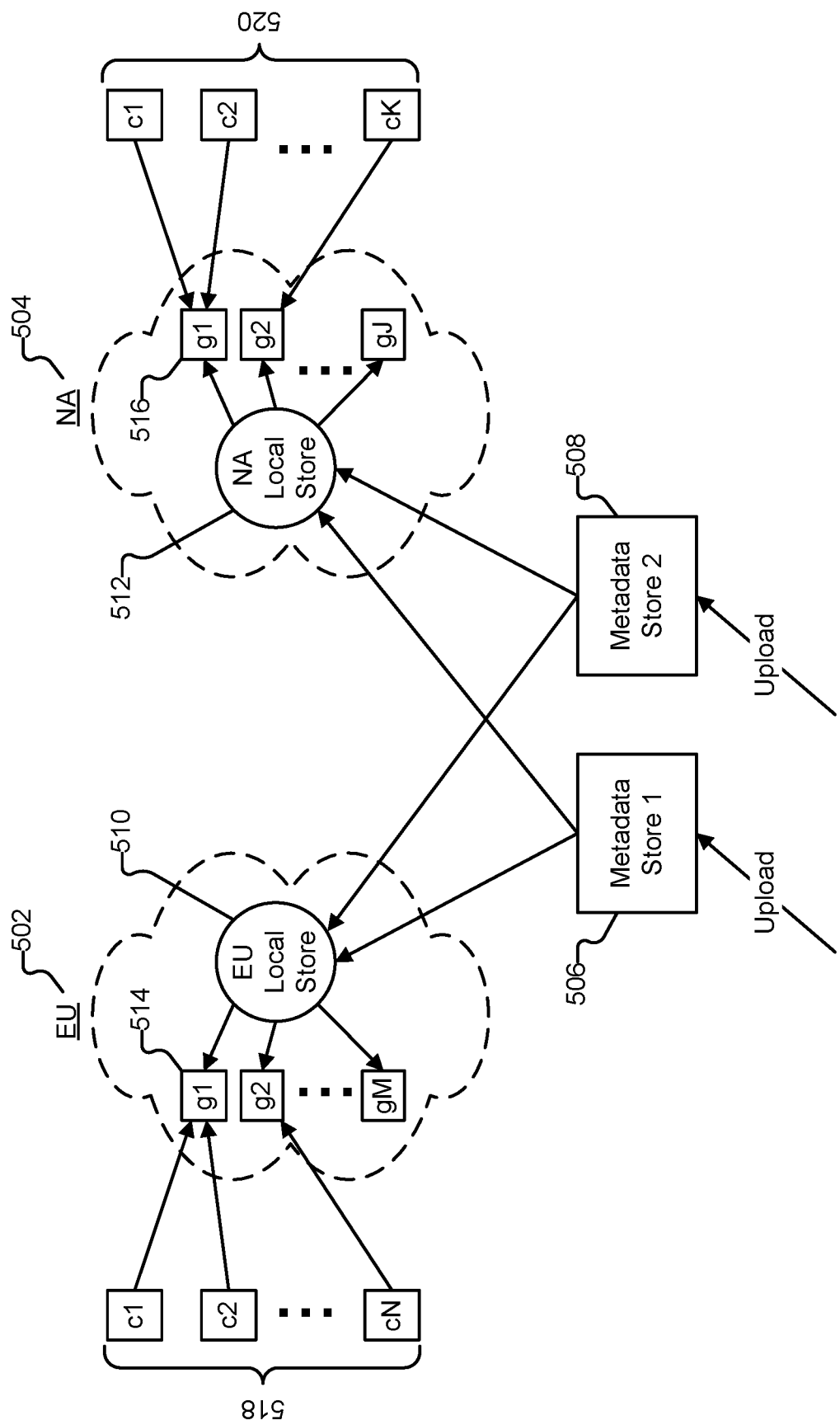
FIG. 5 illustrates an example embodiment of an environment in which metadata is distributed.

FIG. 5 is an example embodiment of an environment in which uploaded metadata is published to distributed gateways. In this example, consider two geographic regions, a European geographic region 502, and a North American geographic region 504.

In this example, metadata files/custom lookup tables (which can be provided by various disparate sources) are uploaded to metadata stores 506 and 508, for example, using the uploading techniques described above (e.g., using uploader 176 of FIG. 1B, where metadata is uploaded to metadata stores such as metadata stores 182 and 184).

As shown, the metadata files stored in metadata stores 506 and 508 are pushed, published, or otherwise communicated/distributed to local metadata stores/caches 510 and 512, which are located in geographic regions 502 and 504, respectively.

Gateways 514 and 516 are configured to obtain metadata files/custom lookup tables from the local data stores residing in their respective geolocations. For example, gateways 514 in the European region 502 obtain metadata files from local store 510, and gateways in 516 in the North American region 504 obtain metadata files from local store 512.

In some embodiments, the gateways are configured with services to query the local metadata store in their geographic region. By providing such local data stores and querying capability, the metadata files, which can be of large volume and size, need not be duplicated at every gateway. Thus, duplication of data is reduced. Further, using local data stores increases the speed at which uploaded metadata files can be distributed, where metadata does not need to be sent to every gateway. This also facilitates maintenance of metadata consistency, as consistency of metadata need not be checked on every single gateway. Instead, metadata consistency can be checked between local data stores and originating, centralized metadata stores (506 and 508). Further, the use of local caches facilitates scalability, where new gateways that are brought online to accommodate new clients can use query services to access their local data store and obtain the most recent metadata files. Local metadata stores can be added as necessary, providing scalable storage metadata files. In one example embodiment, metadata stores 506 and 508, and local stores 510 and 512 are implemented using a database such as Mongo DB, and a file system such as GridFS.

As shown, clients 518 and 520 communicate control plane traffic, such as video session heartbeats described above, to gateways in their geographic regions. The heartbeats received by the gateways are then tagged with additional metadata obtained from their local store, for example, using a query service as described above. Examples of techniques for aligning relevant metadata across multiple disparate sources and consolidating the metadata with a video session (e.g., inserting additional metadata information into a heartbeat associated with a video session) are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive metadata from one or more remote sources;
receive, from a remote client, a first set of metadata associated with a video session initiated by the remote client, wherein the first set of metadata associated with the video session is included in a message generated at the remote client that initiated the video session;
based at least in part on existing metadata in the received first set of metadata included in the message generated at the remote client, identify at least a portion of the metadata received from the one or more remote sources as additional metadata to associate with the video session initiated by the remote client; and
generate a second set of metadata associated with the video session at least in part by adding the identified at least portion of the metadata received from the one or more remote sources to at least a portion of the first set of metadata associated with the video session initiated by the remote client; and
a memory coupled to the one or more processors and configured to provide the one or more processors with instructions.

2. The system recited in claim 1, wherein the first set of metadata associated with the video session initiated by the remote client comprises one or more key-value pairs.

3. The system recited in claim 2, wherein identifying the at least portion of the metadata received from the one or more remote sources as additional metadata comprises determining, based at least in part on the one or more key-value pairs, matches to one or more metadata processing rules.

4. The system recited in claim 3, wherein the matched metadata processing rules indicate the additional metadata to associate with the video session.

5. The system recited in claim 1, wherein the existing metadata used to identify the additional metadata to associate with the video session comprises at least one of an asset identifier and an IP address.

6. The system recited in claim 1, wherein the existing metadata used to identify the additional metadata to associate with the video session comprises a subscriber identifier.

7. The system recited in claim 6, wherein the identified additional metadata comprises metadata associated with the subscriber identifier included in the existing metadata.

8. The system recited in claim 6, wherein the subscriber identifier is obfuscated.

9. The system recited in claim 1, wherein the one or more remote sources comprise at least one of a content publisher and an Internet Service Provider.

10. A method, comprising:
receiving metadata from one or more remote sources;
receiving, from a remote client, a first set of metadata associated with a video session initiated by the remote client, wherein the first set of metadata associated with the video session is included in a message generated at the remote client that initiated the video session;
based at least in part on existing metadata in the received first set of metadata included in the message generated at the remote client, identifying at least a portion of the metadata received from the one or more remote sources as additional metadata to associate with the video session initiated by the remote client; and
generating a second set of metadata associated with the video session at least in part by adding the identified at least portion of the metadata received from the one or more remote sources to at least a portion of the first set of metadata associated with the video session initiated by the remote client.

11. The method of claim 10, wherein the first set of metadata associated with the video session initiated by the remote client comprises one or more key-value pairs.

12. The method of claim 11, wherein identifying the at least portion of the metadata received from the one or more remote sources as additional metadata comprises determining, based at least in part on the one or more key-value pairs, matches to one or more metadata processing rules.

13. The method of claim 12, wherein the matched metadata processing rules indicate the additional metadata to associate with the video session.

14. The method of claim 10, wherein the existing metadata used to identify the additional metadata to associate with the video session comprises at least one of an asset identifier and an IP address.

15. The method of claim 10, wherein the existing metadata used to identify the additional metadata to associate with the video session comprises a subscriber identifier.

16. The method of claim 15, wherein the identified additional metadata comprises metadata associated with the subscriber identifier included in the existing metadata.

17. The method of claim 15, wherein the subscriber identifier is obfuscated.

18. The method of claim 10, wherein the one or more remote sources comprise at least one of a content publisher and an Internet Service Provider.

19. A computer program product embodied in a non-transitory computer readable storage medium and comprising computer instructions for:
receiving metadata from one or more remote sources;
receiving, from a remote client, a first set of metadata associated with a video session initiated by the remote client, wherein the first set of metadata associated with the video session is included in a message generated at the remote client that initiated the video session;
based at least in part on existing metadata in the received first set of metadata included in the message generated at the remote client, identifying at least a portion of the metadata received from the one or more remote sources as additional metadata to associate with the video session initiated by the remote client; and
generating a second set of metadata associated with the video session at least in part by adding the identified at least portion of the metadata received from the one or more remote sources to at least a portion of the first set of metadata associated with the video session initiated by the remote client.

* * * * *